No. 759,620. PATENTED MAY 10, 1904.
J. KROHN.
MACHINE FOR MAKING AND REPAIRING ROADS.
APPLICATION FILED AUG. 1, 1903.
NO MODEL. 3 SHEETS—SHEET 3.
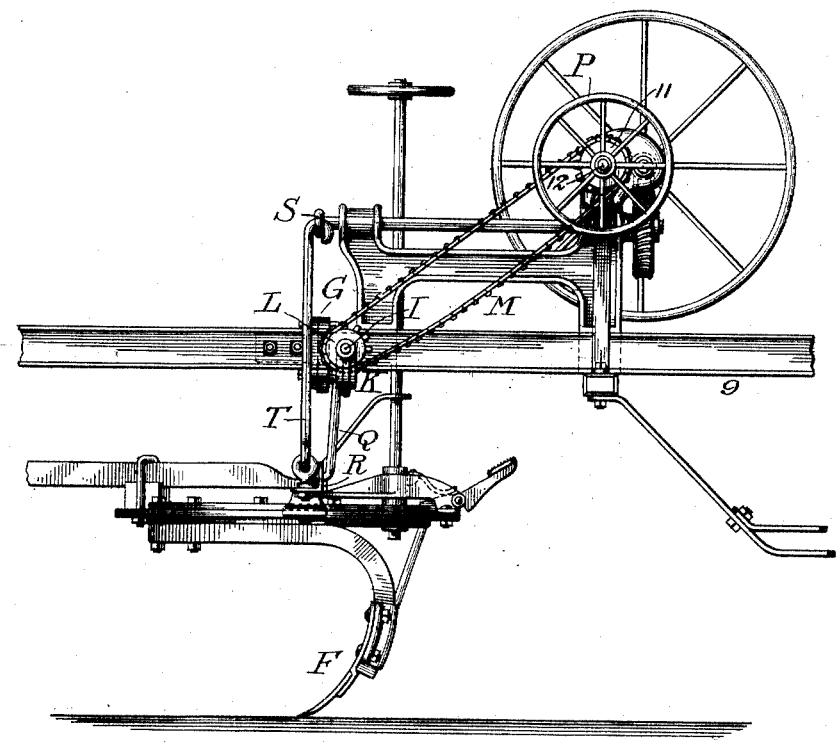
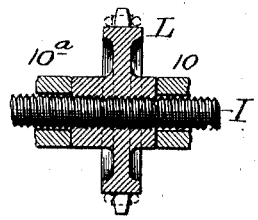
Witnesses:—
Inventor:—
John Krohn
by Chas. G. Page
Atty.

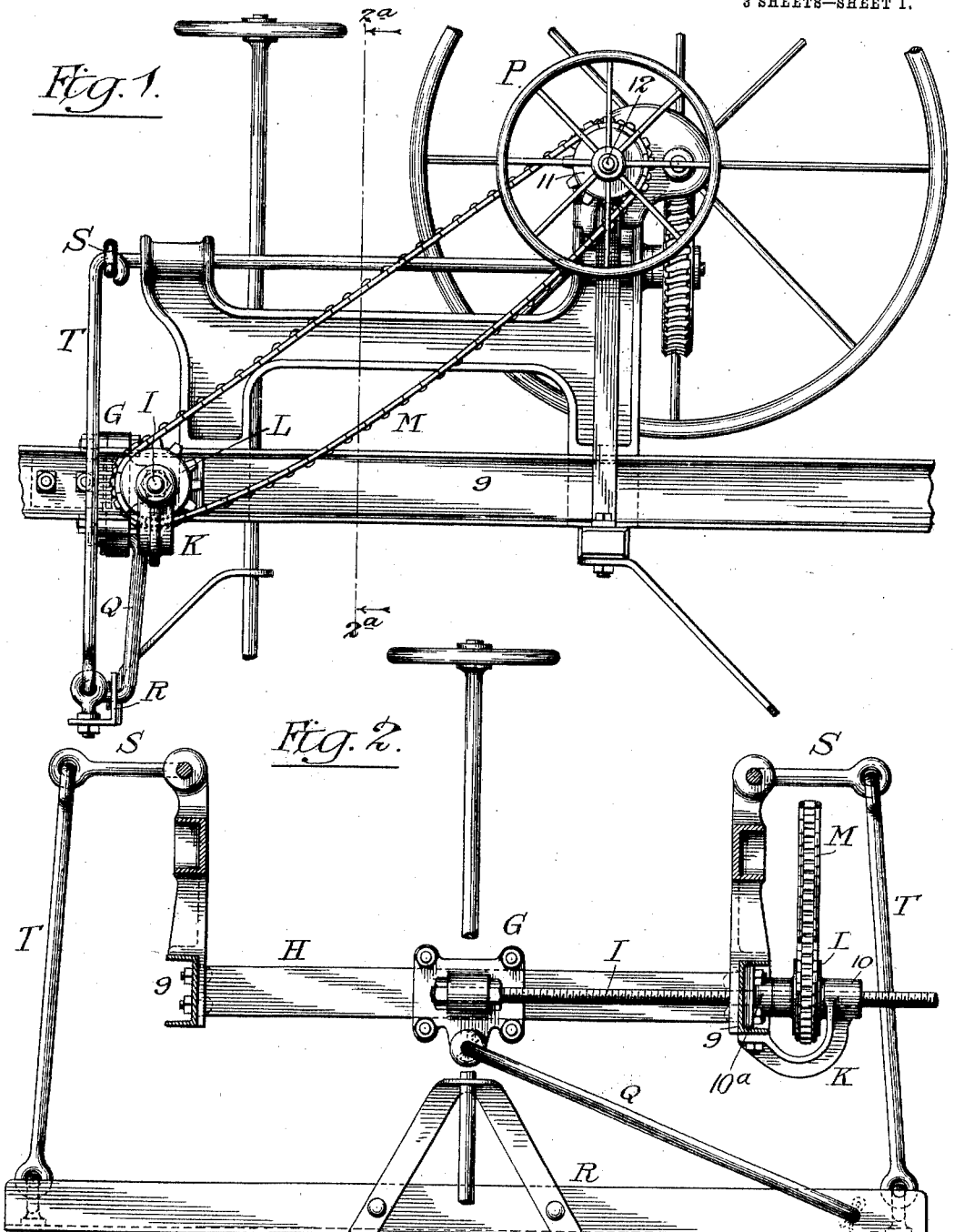

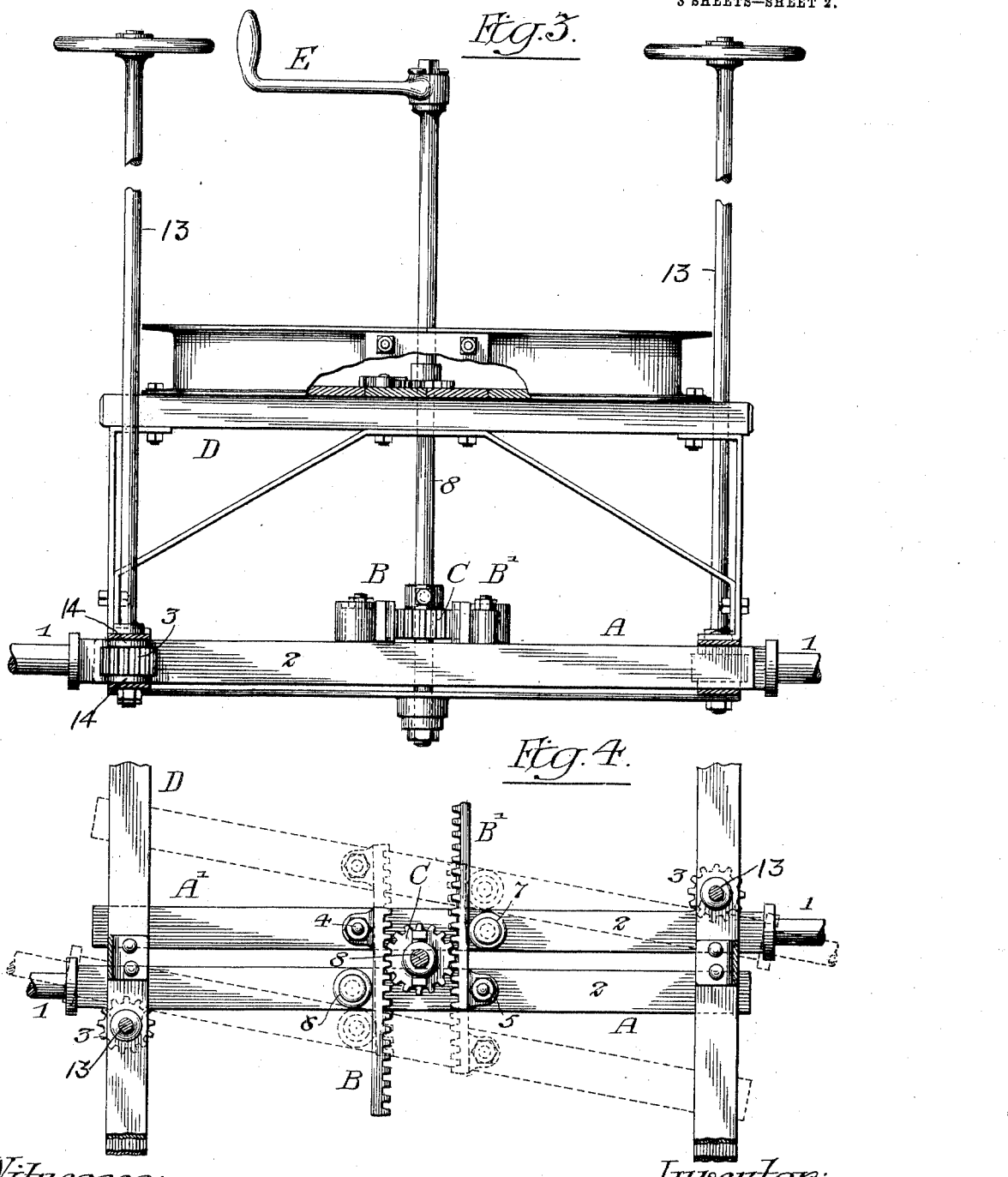

No. 759,620. Patented May 10, 1904.

UNITED STATES PATENT OFFICE.

JOHN KROHN, OF BARBERTON, OHIO, ASSIGNOR TO NATIONAL DRILL AND MANUFACTURING COMPANY, OF CHICAGO, ILLINOIS, A CORPORATION OF WEST VIRGINIA.

MACHINE FOR MAKING AND REPAIRING ROADS.

SPECIFICATION forming part of Letters Patent No. 759,620, dated May 10, 1904.

Application filed August 1, 1903. Serial No. 167,936. (No model.)

*To all whom it may concern:*

Be it known that I, JOHN KROHN, a citizen of the United States, residing at Barberton, in the county of Summit and State of Ohio, have invented certain new and useful Improvements in Machines for Making and Repairing Roads, of which the following is a specification.

My invention relates to road-making and road-repairing machines of the class in which a scraper-blade is arranged for horizontal diagonal adjustment between the front and rear wheels of a suitable carriage or body frame and supported so that it can be raised and lowered and also bodily shifted toward either side of the machine, the rear wheels being arranged upon horizontally-swinging axle portions or sections which can be adjusted longitudinally for the purpose of varying the spread of the rear wheels.

My invention is in part particularly designed as an improvement upon means for swinging the rear-axle sections or portions illustrated in Letters Patent of the United States No. 724,042, dated March 31, 1903, and further illustrated in an application for Letters Patent of Arthur Cameron, executed June 29, 1903.

My invention is also in part designed as an improvement upon means for effecting the side shift of the scraper-blade.

Further objects of my invention are to provide simple and easy-working mechanism for simultaneously swinging the rear-axle portions or sections and for maintaining them in a condition of parallelism and to provide simple and extremely-powerful means for laterally shifting and adjusting the scraper-blade, to avoid a multiplicity of gearing, so as to materially reduce expense, and to provide certain novel and improved matters of detail, substantially as hereinafter set forth.

In the accompanying drawings, Figure 1 is a side elevation of a portion of the machine comprising my improved device for laterally shifting the scraper-blade. Fig. 2 is a section on line $2^a$ $2^a$ in Fig. 1. Fig. 3 represents a portion of the machine in rear end elevation with parts thereof broken away. Fig. 4 is a top plan view of the rear-axle portions and the device for swinging them illustrated in Fig. 3, the plan obtained in said Fig. 4 being also a horizontal section through Fig. 3 on a plane just above the device for engaging and adjusting the rear-axle portions. Fig. 5 shows in side elevation the major portion of a road making and repairing machine embodying my invention, the rear portion involving the rear-axle portions being omitted. Fig. 6 is a detail showing in section the sprocket L and the shoulders 10, between which it is arranged, a portion of the screw I being shown in elevation.

The carriage or body frame may be of any suitable construction—for example, substantially as shown in said Patent No. 724,042— and hence in the accompanying drawings only portions of the body-frame are illustrated and the rear wheels omitted for convenience of illustration. The swinging rear-axle portions A A' are constructed as in the patent hereinbefore referred to, said axle portions comprising boxes or housings 2, respectively pivoted at opposite sides of the machine and affording bearings for the axle bars or sections 1 1, arranged to slide longitudinally within the boxes or housings 2 and provided with rack-teeth, which are engaged by adjusting pinions 3 as in the patent referred to. With reference to my improvement in this portion of the machine B B' indicate a pair of substantially parallel rack-bars arranged longitudinally as to the length of the machine. One of these rack-bars is pivoted, as at 4, to one of the boxes or housings 2, while the other rack-bar is pivoted to the other box or housing, as at 5, it being observed that one of these rack-bars extends forwardly from its point of pivotal connection and that the other rack-bar extends rearwardly from the points at which it is thus pivoted. These two rack-bars are engaged by a pinion C, which is arranged between them, so that when the pinion is turned the two rack-bars will be forced, respectively, in opposite directions—that is to say, one will be forced forwardly and the other will be forced rearwardly.

In order to keep the rack-bars in engagement with the pinion C, one of the housings 2 is provided with an antifriction-roll 6, arranged to back and engage the outer smooth side of the rack-bar B, and the other housing is provided with a like antifriction-roll 7, engaging the smooth outer side of the rack B'. When, therefore, the pinion is operated in either direction, it will cause the rack-bars to shift longitudinally, and thereby swing the axle portions, with which the rack-bars are pivotally connected, so as to provide self-adjusting connections between the swinging axle portions and the longitudinally-movable rack-bars. During operation the rack-bars will not materially depart from a condition of parallelism, and at all times they will be in working engagement with the pinion C. This pinion C is secured upon a rotary vertical shaft 8, which is suitably supported upon the body-frame D of the carriage and provided at its upper end with a crank-handle E or its equivalent, a suitably large hand-wheel. As illustrated in Fig. 4, the antifriction-rolls 6 and 7 are in a right line oblique to the rack-bars and intersecting the axis of the shaft 8, and in like manner the pivots 4 and 5, by which the rack-bars are connected with the swinging axle portions, are also oblique to the rack-bars and on a right line intersecting the axis of the vertical shaft 8.

With reference to mechanism for effecting side shift of the scraper F, G indicates a slide supported upon the body-frame and arranged for reciprocating movement in directions transverse to the line of progression. This slide is conveniently supported upon a cross-bar H, secured to opposite sides of the body-frame and practically forming a part of the latter. A horizontally-arranged screw-rod I is rigidly secured at one end to the slide G. This screw-rod is parallel with the cross-bar H and extends through an opening in one of the side bars 9 of the body-frame and an opening formed through the outer end portion of the bracket K, which is secured upon the body-frame.

The sprocket L, having an internally-threaded hub, is arranged upon the screw-rod I at a point between shoulders formed by the outer end portion 10 of the bracket K and a similar shoulder 10ª on the next adjacent side of the body-frame. This internally-threaded sprocket is adapted to engage the threaded rod I as a nut thereon and to cause said rod to move longitudinally when the sprocket is revolved in either direction. The sprocket L is conveniently operated by an endless chain or link belt M, arranged to engage the sprocket L, and also to engage a sprocket 11, secured upon a rotary shaft 12, having a hand-wheel P. By this arrangement an attendant standing on the machine can easily operate the hand-wheel P, and thereby adjust the scraper-blade toward either side of the machine in accordance with the direction in which the hand-wheel is turned. Some suitable power-transmitting device is of course provided between the slide G and the scraper-blade—as, for example, a rod or link Q may have its upper end hinge-connected with the slide and its lower end similarly connected with a cross-bar R, attached to the support or carrier for the scraper-blade and suspended from vertically-swinging arms S by links T.

With further reference to the rear-axle portions, the boxes or housings 2 form guide-bearings for the longitudinally-adjustable axle-sections 1, and as these bearings are pivoted substantially as in said patent and application they of course permit the axle-sections to swing horizontally. The racks B B' are conveniently hinged or pivoted to these boxes or bearings 2 2, by which arrangement the racks are, in effect, pivotally connected with the axle-sections, the latter practically having shifting pivotal connections with the racks. By the arrangement illustrated the axle-sections are maintained relatively parallel, as in the patent herein referred to. In said patent the horizontally-swinging housings 2 2, which form parts of the rear-axle sections, are pivoted, respectively, at opposite sides of the machine, and the hand-wheel shafts, having pinions 3, are conveniently used as pivots for such purpose. This arrangement is also herein illustrated, the rotary hand-wheel shafts 13, having pinions 3 at their lower end portions, being arranged to extend through suitable bearings on the body-frame and to engage suitable bearings on the housings 2, as illustrated in Fig. 3, in which one of such shafts extends through pivot-bearings 14 on one of the housings 2, it being understood that the other housing 2 is also provided with like bearings for the remaining hand-wheel shaft 13.

What I claim as my invention is—

1. In a machine for making and repairing roads, a pair of independent, swinging and longitudinally-adjustable axle-sections for the rear wheels having pivotal connections with the body-frame respectively at opposite sides of a point between the rear wheels; racks respectively connected with one and the other of the swinging and longitudinally-adjustable rear-axle sections, and a pinion for operating the racks in relatively opposite directions.

2. In a machine for making and repairing roads, a pair of swinging and longitudinally-adjustable axle-sections for the rear wheels; swinging boxes or housings for said axle-sections respectively pivoted at opposite sides of a point between the rear wheels; a couple of racks respectively pivoted to one and the other of said swinging housings or bearings; a pinion engaging the racks; means for operating the pinion; and guides arranged upon the housings or bearings and engaging the racks, the guide on each housing or bearing being in engagement with the rack which is pivoted or hinged to the other housing or bearing.

3. In a machine for making and repairing roads, a pair of axle housings or bearings pivotally connected with the body-frame respectively at opposite sides of a point between the rear wheels; axle-sections for the rear wheels adjustable within said swinging housings or bearings; a pair of racks respectively pivoted to the forward and rearward housings or bearings of the axle-sections, and arranged longitudinally as to the length of the machine; a pinion arranged between and engaging the racks; a suitable device for operating the pinion; and antifriction-rolls 6 and 7 arranged upon the boxes or bearings for the rear-axle sections, and arranged to engage the racks.

4. In a machine for making and repairing roads, a slide supported for movement transverse to the length of the machine; suitable connection between the slide and a support or carrier for the scraper-blade; a transversely-arranged screw-rod secured to the slide; a nut engaging the screw-rod and held against end movement; and means for revolving the nut in opposite directions in alternation to cause longitudinal movement on the part of the screw-rod, and thereby adjust the slide and shift the support or carrier for the scraper-blade.

5. In a machine for making and repairing roads, a slide supported upon the body-frame and arranged for movement transverse to the length of the machine; suitable power-transmitting connection between the slide and a support or carrier for the scraper-blade; a transversely-arranged screw-rod secured to the slide; a sprocket internally formed as a nut and engaging the screw-rod, said sprocket being held against end movement, and means for operating said sprocket comprising a link belt trained thereon and also engaging a sprocket which is connected with a hand-wheel.

JOHN KROHN.

Witnesses:
H. C. TULLY,
T. B. WILLIAMS.